US005167385A

United States Patent [19]

Häfner

[11] Patent Number: 5,167,385

[45] Date of Patent: * Dec. 1, 1992

[54] AIRCRAFT AND SYSTEM AND METHOD FOR OPERATING THEREOF

[75] Inventor: Hans W. Häfner, Aichach, Fed. Rep. of Germany

[73] Assignee: Pfister GmbH, Augsburg, Fed. Rep. of Germany

[ * ] Notice: The portion of the term of this patent subsequent to May 16, 2006 has been disclaimed.

[21] Appl. No.: 302,896

[22] Filed: Jan. 30, 1989

[30] Foreign Application Priority Data

Feb. 2, 1988 [DE] Fed. Rep. of Germany ....... 3803015

[51] Int. Cl.[5] .............................................. B64C 13/00

[52] U.S. Cl. .................................. 244/76 R; 244/195; 364/426.05; 73/862.68; 73/775; 73/65; 280/707

[58] Field of Search .................. 244/75 R, 76 R, 194, 244/195, 111; 364/426.05, 434, 464, 802; 73/862.68, 775, 65; 280/707; 188/181 T

[56] References Cited

U.S. PATENT DOCUMENTS

| | | | |
|---|---|---|---|
| 2,722,587 | 11/1955 | Buzzetti et al. | 73/802 |
| 2,992,860 | 7/1961 | Hirzel | 244/111 |
| 3,205,464 | 9/1965 | Schwartz | 73/862.68 |
| 3,625,053 | 12/1971 | Lamins | 73/775 |
| 3,800,127 | 3/1974 | Knemeyer et al. | 235/150.22 |
| 3,805,413 | 4/1974 | Burny et al. | 34/12 S |
| 3,881,670 | 5/1975 | Doniger | 244/77 M |
| 4,004,756 | 1/1977 | Gerstine et al. | 244/17.13 |
| 4,175,429 | 11/1979 | Keck | 73/862.68 |
| 4,312,042 | 1/1982 | Bateman | 364/463 |
| 4,394,999 | 7/1983 | Botzler | 244/78 |
| 4,536,843 | 8/1985 | Lambregts | 364/434 |
| 4,644,805 | 2/1987 | Hafner | 73/862.68 |
| 4,648,569 | 3/1987 | Stewart | 244/76 R |
| 4,697,768 | 10/1987 | Klein . | |
| 4,703,663 | 11/1987 | Oppermann | 73/862.68 |
| 4,706,902 | 11/1987 | Destuynda . | |
| 4,725,020 | 2/1988 | Whitener | 244/76 R |
| 4,739,666 | 4/1988 | Hafner et al. | 73/862.68 |
| 4,786,009 | 11/1988 | Rao et al. | 244/75 R |
| 4,796,192 | 1/1989 | Lewis | 364/463 |
| 4,830,399 | 5/1989 | Hafner | 280/707 |
| 4,869,444 | 9/1989 | Ralph | 244/104 |

FOREIGN PATENT DOCUMENTS

| | | |
|---|---|---|
| 3620888 | 1/1988 | Fed. Rep. of Germany . |
| 8702129 | 4/1987 | PCT Int'l Appl. . |

*Primary Examiner*—Galen Barefoot

*Attorney, Agent, or Firm*—Armstrong & Kubovcik

[57] ABSTRACT

An aircraft and a method and system for operating thereof as force/moment sensors integrated in elastic connecting joints of parts and units of the aircraft. The various force/moment components determined by the sensors are processed in order to generate control signals for optimizing the operation of the aircraft.

9 Claims, 5 Drawing Sheets

10 38 46 36 44 15 22 36 20 24 30 14 42 50 42 40 48 22 40 17 20 32 26 28 34 12

126 116 120 130 114 129 112 128

| MEASURED PARAMETER | MEASUREMENT INFORMATION | APPT. OF INFORMATION |
|---|---|---|
| FORCE SENSOR (VERTICAL) | INDIVIDUAL WHEEL FORCE | TIRE LOADING AERODYNAMIC BUOYANCY |
| STATIC AND DYNAMIC WHEEL LOAD SIGNAL | SUM OF THE WHEEL FORCES | LIFTING OFF WEIGHT<br>AERODYNAMIC BUOYANCY |
| | DAMPENING | ADJUSTM. OF DAMPENING;<br>CONDITION OF THE GROUND;<br>CONDITION OF THE TIRE AND LANDING GEARS |
| FORCE SENSOR (OBLIQUE) | ROLLING AND BRAKING FORCES | BRAKING FORCE CONTROL WHEEL MOMENTS |
| HORIZONTAL FORCE COMPONENT (STATIC/DYNAMIC) | POSITION OF THE STATIC CENTRE OF GRAVITY | DISTRIBUTION OF ADDED LOAD AND FUEL |
| | POSITION OF THE AERODYNAMIC CENTRE OF GRAVITY | AERODYNAMIC TRIMMING SHORTLY BEFORE LIFTING OFF |
| | ROLLING SPEED | FRICTIONAL VALUE WHEEL/GROUND |
| PERIPHERAL WHEEL SPEED;<br>STEERING ANGLE | STEERING | ABS CONTROL SERVO STEERING |
| COVERED DISTANCE | | ROLLING DISTANCE COVERED;<br>JUDGEMENT ON ACCELERATION AND BRAKING;<br>ROLLING DISTANCE LEFT STARTING/ START ABORTION |

Fig.2

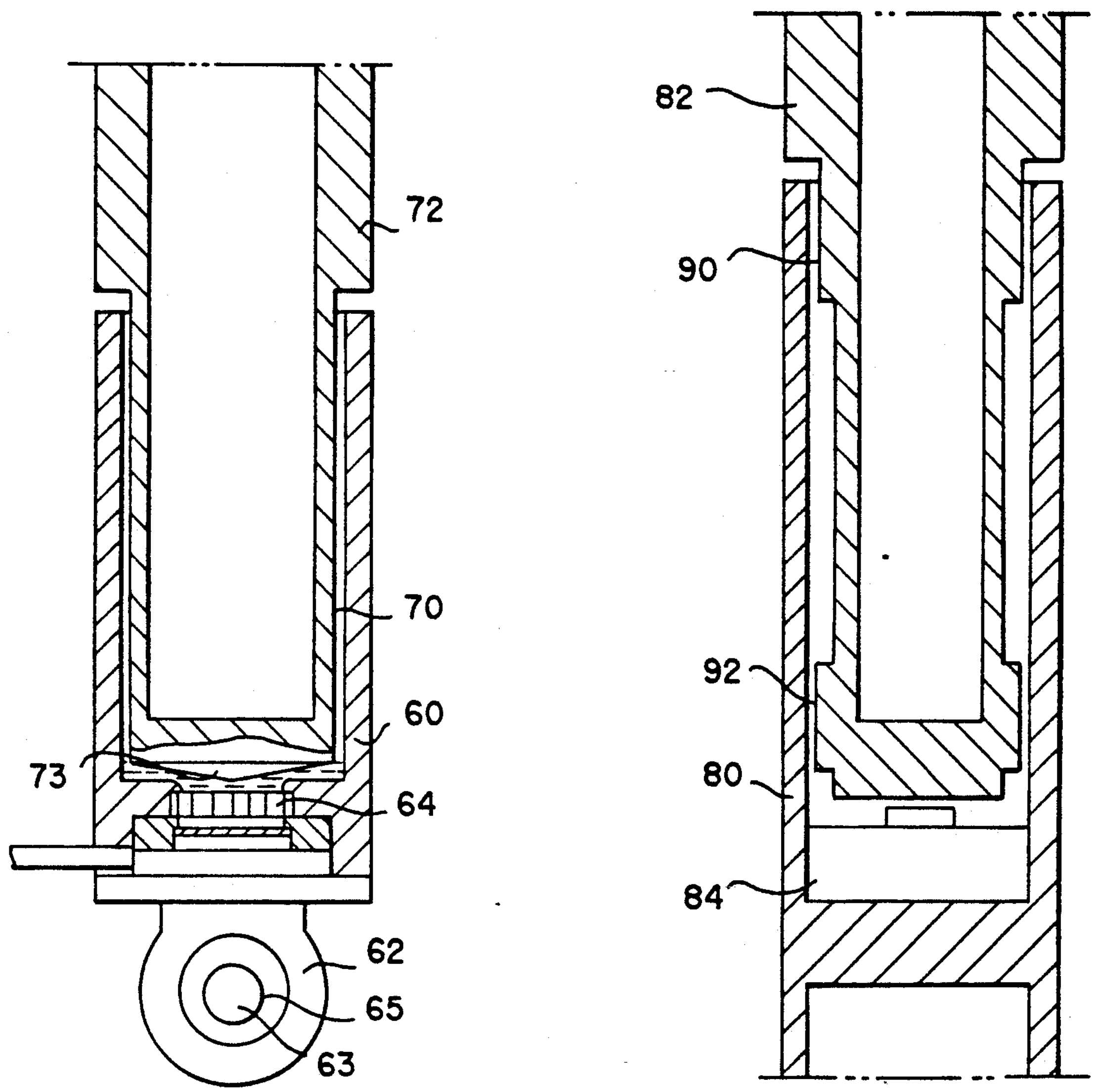
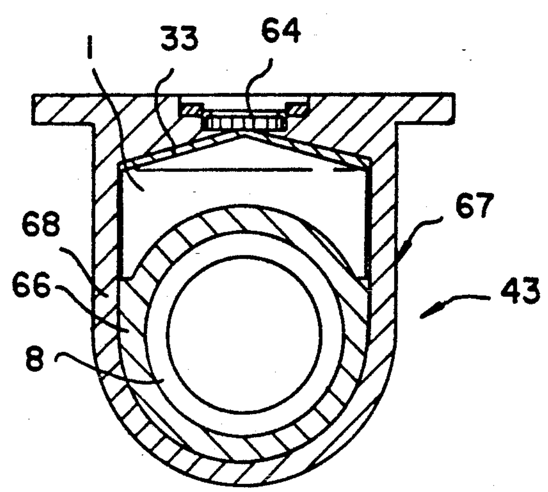
Fig.5

AIRCRAFT AND SYSTEM AND METHOD FOR OPERATING THEREOF

FIELD OF THE INVENTION

The invention relates to an aircraft and a method and a system for operating such aircraft provided with elastic joints between parts and units thereof and using sensors for determining various parameters useful to control the operation of the aircraft.

BACKGROUND OF THE INVENTION

For operating aircraft as passenger airplanes it is very useful and, for automatic steering, necessary to provide information about forces and moments acting upon the aircraft specifically when starting and landing.

The U.S. Pat. No. 2,443,045 discloses a system determining the centre of gravity and the gross weight of an airplane on the ground prior to take-off. For this purpose a nose wheel strut has secured the two strain gauges on that portion of the strut bearing the direct load of the airplane. Main landing gear struts have strain gauges mounted in a similar manner. The airplane gross weight is equal to the sum of the loads supported by the main gear struts and the nose gear strut.

The U.S. Pat. No. 3,900,828 discloses an on-board tire strut fault apparatus for aircraft again using strain gauges for sensing the loading conditions on the ground. Defective degradations and faults of tire and/or strut suspensions are signalled automatically by way of electrical comparison of the output signals from diagonally disposed strain gauges. Again the weight and centre-of-gravity may be determined.

The German Laid Open Publication No. 36 20 888 relates to a system for monitoring the loading of structure components of aircraft using the capturing, processing and storing of load relevant parameters during the operation of the aircraft for evaluation on the ground for continuously monitoring a predetermined stability thereof. For this purpose output signals of sensors are processed and are provided for determining the speed acceleration mass centre of gravity and excursions of the wing lids.

The European Patent Application Publication No. 0066923 (U.S. Patent Application Ser. Nos. 265031 of May 18, 1981 and 371321 of Apr. 26, 1982) discloses an aircraft structural integrity assessment system similar to that discussed above but employing structural moment detectors to measure and record certain effects of forces acting on the structure of an aircraft.

The German Patent Laid Open Publication No. 30 43 055 (U.S. Patent Application Ser. No. 102776 filed on Dec. 12, 1979) discloses a mass measuring system for an aircraft using a pair of inclination sensors determining the bending angle of a part of the aircraft due to the gross weight thereof.

The U.S. Pat. No. 5,123,937 discloses a method for determining inclination changes of a wheel axle of a truck dependent on the load.

The U.S. Patent Application Ser. No. 057,892 filed May 21, 1987 (International Patent Application WO 87/02129) relates to a method and a system for operating ground vehicles using force/moment measuring devices integrated into elastic connections and/or support positions thereof, determining the forces and/or moments acting upon the vehicle or parts thereof by means of the force/moment measuring devices, processing these values and optimizing the operating characteristics of the vehicle on the basis of the results of the processing.

Aircraft are not mentioned in this publication though the one or other measurement indicated there may be applied for aircraft, too. However, in many aspects, the situation is much different for aircraft as compared with ground vehicles since quite different parameters have to be considered.

Essential aspects with aircraft are in particular the safety during starting and landing as well as a minimum of energy consumption. The safety during starting depends in particular on the rolling distance already covered, the actual momentary speed, the gross weight, the momentary boyancy, the position of the static and the aerodynamic centres of gravity and various other parameters. Energy consumption is essentially determined by the position of the aerodynamic centre of gravity in respect of the static centre of gravity. For landing to a major part similar aspects are applicable as for starting.

SUMMARY OF THE INVENTION

It is a principal object of the invention to provide a method and a system for operating aircrafts with considerably increased safety during starting and landing.

It is a further object of the invention to provide a method and a system for operating aircraft with considerably reduced energy consumption.

It is a still further object of the invention to provide a method and a system for operating aircraft using sensors arranged very simply and protected within parts or units of the aircraft offering increased accuracy of measurement.

These and other objects are achieved by an aircraft having a plurality of essentially rigid parts elastically connected with each other comprising: elastomeric material provided in connecting joints between said rigid parts; at least one sensor integrated in said connecting joints for determining forces and/or moments, respectively, acting at said connecting joints and generating signals representing said forces and/or moments; and processing and controlling means for said aircraft, connected to said sensors and having said signals of said sensors applied thereto for providing signals for controlling the operation of said aircraft dependent on said forces/moments measured by said sensors.

According to a further aspect of the invention there is provided a method of operating an aircraft in dependence on forces and/or moments acting thereon comprising the steps of: integrating force/moment sensors into elastic connections and/or support positions, respectively, of said aircraft; continuously determining said forces and/or moments acting upon said aircraft or parts thereof, respectively, by means of said force/moment sensors; processing values determined by said force/moment sensors; generating control signals for various units of said aircraft in dependence on said forces/moments measured by said force/moment sensors in order to optimize the operation of said aircraft.

According to still a further aspect the invention provides a system for controlling the operation of an aircraft having a plurality of essentially rigid parts elastically connected with each other comprising: force/moment sensor means integrated in elastic connecting joints between said rigid parts for determining forces and/or moments, respectively, acting at said connecting joints and generating signals representing said forces and/or moments; a system control unit connected to said sensors for having signals of said sensors applied thereto, evaluating and processing said signals and providing output signals for controlling the operation of various units of said aircraft dependent on said forces/moment measured by said sensors.

BRIEF DESCRIPTION OF THE DRAWINGS

FIG. 2 is a table indicating parameters which may be measured or determined by the system according to the invention and measurement information derived therefrom together with a corresponding use of this information for optimizing the operation of the aircraft;

FIGS. 3,4 show two alternatives of incorporating the elastic joints used in connection with the invention and having integrated a force sensor thereto;

FIG. 5 illustrates a further embodiment of an elastic joint having integrated a force sensor and adapted for use in connection with the invention;

DESCRIPTION OF THE PREFERRED EMBODIMENT

FIG. 1 shows an airplane 10, in particular a passenger airplane with a projecting main landing gear 12 and a projecting front landing gear 14.

Figure 1A:
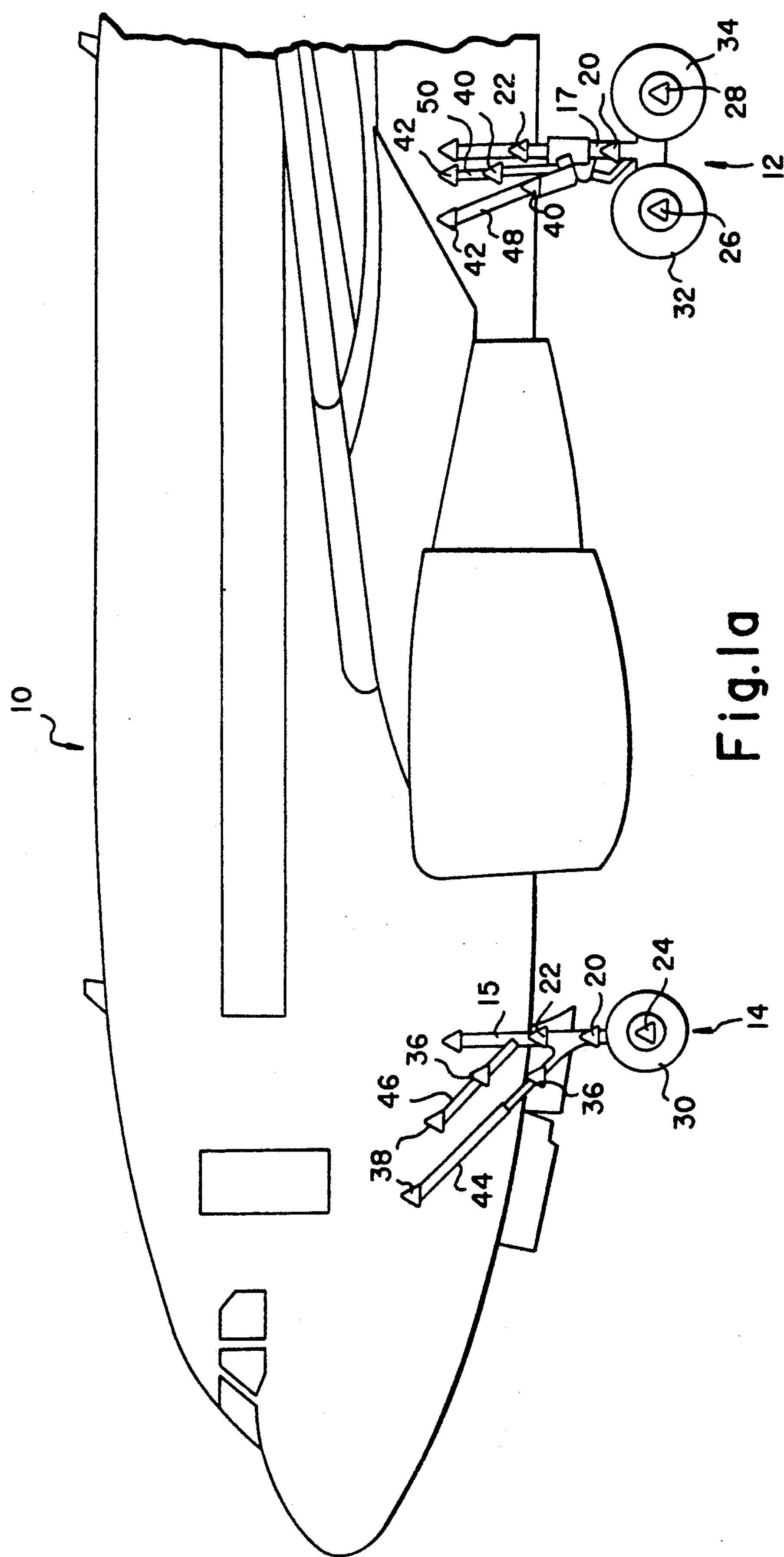
FIG. 1a is a schematic elevational view of a portion of an air plane illustrating the positions for locating sensors.
Figure 1B:
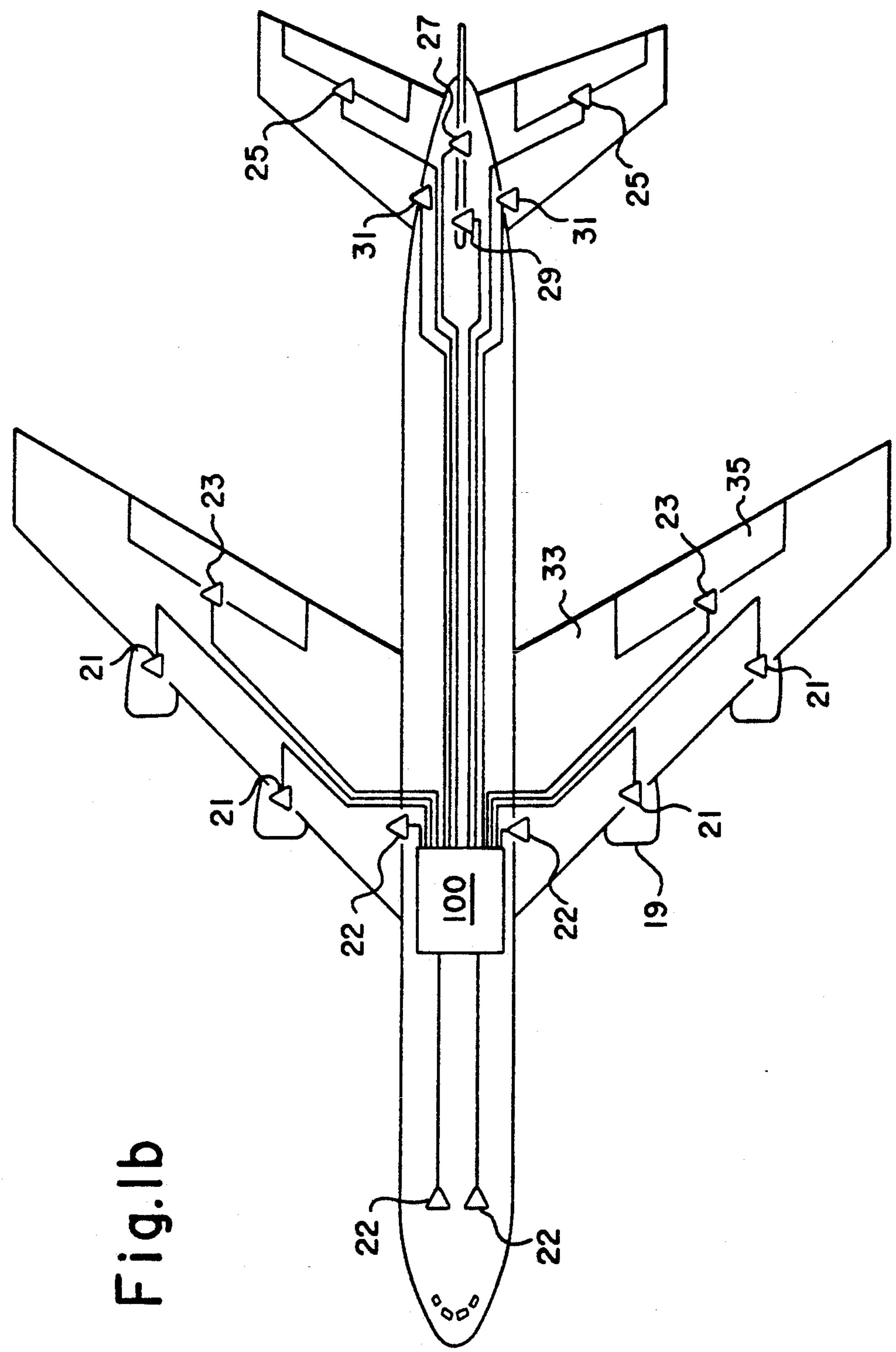
FIG. 1b a schematic plan view of an airplane illustrating positions of force/moment sensors as used according to the invention.

Between the connection joints of the landing gears at the airplane body and at the wheels various elements are provided connected with each other. According to the invention at least part of these connecting joints may be formed as elastic joints having integrated thereto force, pressure or torque (moment) sensors, hereinafter simply called sensors. In FIGS. 1a and 1b exemplary positions are indicated where sensors may be provided. In FIG. 1a and 1b these sensors are represented by triangles.

As examples only the following positions are mentioned:

Sensors 20 and 22 in a central vertical strut 15 and 17 of the main landing gear and the front landing gear, respectively, in particular for determining the momentary load acting onto each landing gear and of oscillations resulting in particular from the roughness of the ground.

Further sensors are 24, 26, 28 for determining the load acting on individual wheels 30, 32, 34. The sensors 24, 26 and 28 may be torque sensors as well determining the momentary torques acting onto the individual wheels.

Sensors 36, 38, 40 and 42 are arranged in support bars 44, 46, 48 and 50, respectively, inclined to the horizontal and spreading in upward direction. The signals of these sensors may be used in combination with signals of the sensors for vertical forces to determine horizontal force components acting onto the landing gears in the direction of movement and lateral thereto during landing and starting.

Further sensors may be provided in the region of the pivoting of the landing gear struts and the support bars, respectively, with the aircraft body, partially alternatively to the sensors indicated before or in addition thereto. It should be noted that corresponding torques or moments may be calculated from the determined forces and the associated lever arms through which these forces are applied.

FIG. 1b shows schematically further positions where force/moment sensors may be advantageously located. In addition to the sensors enumerated above and marked with the same reference numerals in FIG. 1b as in FIG. 1a force/moment sensors 21/may be provided at or within, respectively, connecting joints of lead engines 19 for determining forces, moments and/or oscillations acting at the jet engines and/or caused by them.

Further force/moment sensors 23 may be arranged at or within the connecting joints between wings 33 and landing lids 35 of the airplane. Furthermore, force/moment sensors may be provided at various locations of the empennage of the airplane, as sensors 25, 27, 29 and 31 at or within connecting joints of the horizontal and/or vertical fins.

FIGS. 3 and 4 show in schematic views examples of embodiments of elastic joints having at least one sensor integrated thereto.

For example, according to FIG. 3 for a landing gear strut an exterior tube 60 is closed at its bottom end by a hinge element 62, for example screwed thereto, the hinge element 62 having a horizontal bore 65 through which, for example, an axle 63 of the front wheel 30 may extend. At the bottom of the exterior tube 60 a sensor 64 is inserted which is preferably exchangable. In the exterior tube 60 an inner tube 72 is inserted with its lower end closed by an end portion 73. A narrow annular gap 70 formed between the exterior tube 60 and the inner tube 72 as well as a space between the sensor 64 and the lower end portion 73 is filled with bubble-free elastomeric material. The inner height of the exterior tube 60 preferably is selected considerably larger than its inner diameter resulting in an excellent diversion of lateral forces. Thus, the sensor 64 determines the vertical component of the force acting onto the inner tube 72 practically without friction. It should be noted, that the elastomeric material fixedly adheres to the contacting metal surfaces of the exterior tube 60 and the inner tube 72.

FIG. 4 shows an alternative embodiment of an elastic joint having integrated thereto a load cell 84 commercially available. The load cell 84 may be an elastostatic force measuring cell as disclosed in U.S. Pat. No. 4,754,653. Again, as with the embodiment of FIG. 3 in an exterior tube 80 there is supported the load cell 84, in this case a separate prefabricated element. An inner tube-like piston 82 acts onto the load cell 84 being surrounded at two spaced positions with elastomeric material 90, 92 fixedly adhering to the contacting metal surfaces, for example, by vulcanisation.

As with the embodiment of FIG. 3 the sensor of this embodiment according to FIG. 4 has an extremely small displacement when loaded which results in a practically friction free guidance in vertical direction whilst lateral forces are passed off or diverted to the exterior tube 80 without any influence on the load cell 84.

FIG. 5 shows an elastic joint 43 which may be loaded both by pressure and tension. With this embodiment a stud 8 is surrounded by elastomeric material 66 and extends laterally through a fixing element 67, wherein the lower portion 68 of which is formed cylindrically in order to house the stud 8 surrounded by the elastomeric material 66. Through a piston 7 forming a narrow annular gap with the inner peripheral surface of the connecting element 67 and through further elastomeric material 33 filling a gap between the upper end face of the piston 7 and an inner radial surface of the connecting element 67 there is transmitted a vertical force acting between the connecting element 67 and the stud 8. Such a joint may be loaded both by pressure and tension. For exerting tension the connecting or supporting element may surrounded by a corresponding tension element.

In this connection it is referred to U.S. Pat. No. 4,644,805 disclosing various elastic joints having sensors integrated therein. Also, elastic joints for direct torque measuring have been disclosed there. Such elastic joints may be used with greater advantage for aircraft. In particular, in the horizontal bore 63 of FIG. 3 at least one sensor may be integrated into the elastomeric material for torque (moment) measurement.

It is now referred to FIG. 2 showing schematically several parameters which may be determined by sensors as explained above, measurement information derived from these parameters and possible use of this information for optimizing the operation of an aircraft.

Even before the start of the aircraft valuable information may be determined by the integrated sensors. This information includes the gross weight resulting from the sum of the vertical wheel forces, as well as the position of the static centre of gravity of the aircraft which may be determined from the relation between the individual vertical wheel forces. Furthermore, the loading of the aircraft may be monitored continuously and arranged such that a desired position of the static centre of gravity is achieved. A fine balancing is accomplished by a proper distribution of fuel to the various tanks.

An important check is made immediately prior to the start when the thrust is determined by heavy loading of the motors with the aircraft still at rest. Up to now only rather vague information on the basis of the speed of the motor was available. With the system according to the invention using the horizontal component determined by the above identified sensors very exact data may be achieved for the thrust applied.

Then, the dynamic signals are of major importance derived from the various force and moment (torque) sensors during starting. Specifically, the momentary tire load as well as the aerodynamic buoyancy may continuously be derived from the dynamic vertical wheel load signals giving information about the momentary load acting on the aircraft in terms of amount and direction. Again, the momentary areodynamic buoyancy essential for the time of lifting off from the ground may be continuously determined by the sum of the individual vertical wheel forces.

The oscillations determined by means of the sensors result in signals adapted to be used for adjusting the dampening force at the landing gear. For example, it is possible to adapt the dampening to the condition of the lane. Furthermore, these signals give an information about the condition of the tires and the landing gears.

For the time of lifting off the aircraft from the ground the position of the aerodynamic centre of gravity is of importance which position may be determined from the signals of the sensors for both the vertical and the horizontal force components which signals may be used for aerodynamic trimming shortly before the aircraft becomes airborne.

It should be noted that further signals determined and used with known aircraft, as the peripheral speed of the wheels, the steering angle and a distance measuring on the basis of the wheel rotation, i.e. the rolling distance covered, may be additionally used for processing the signals of the sensors according to the invention.

The absolute rolling speed when starting and landing may be determined quite exactly, independent from the inherent relatively large friction of the wheels on the ground, by correlating the oscillations derived from wheels spacedly arranged in rolling direction, i.e. from the wheels 26 and 28 of the main landing gear or the wheel 24 of the front landing gear and one (or both) wheels 26 and 28, respectively, of the main landing gear as it has been disclosed in the German Laid Open Patent Publication No. 34 35 866. By mathematical integration the exact rolling distance covered may be calculated as well.

By comparing the absolute rolling speed and the peripheral wheel speed the slippage of the individual wheels may be determined. By combining this slippage with the determined horizontal and vertical forces the frictional value between the wheels and the lane may be determined and the necessary force of friction may be optimally adjusted by antilocking systems now in use for years. However, the control is much more exact due to the exact measuring results.

In this connection it should be noted, that naturally the sensors are preferably arranged symmetrical to the longitudinal axis of the aircraft left and right at the landing gears. This means, that different loadings, in particular due to wind forces acting laterally from the front or the rear may be determined by comparing the measuring results of the individual sensors at both sides of the longitudinal axis of the aircraft. This permits a momentary trimming of the aircraft and a servo-supported steering thereof.

From the above it will be appreciated that the determined measuring values and the information derived therefrom permit an essentially more exact consideration of the acceleration or breaking distance left during start or landing, respectively, of the aircraft than it was possible up to now. Thus, an eventually necessary abortion of the starting or landing may be recognized faster and more precisely.

Figure 6:
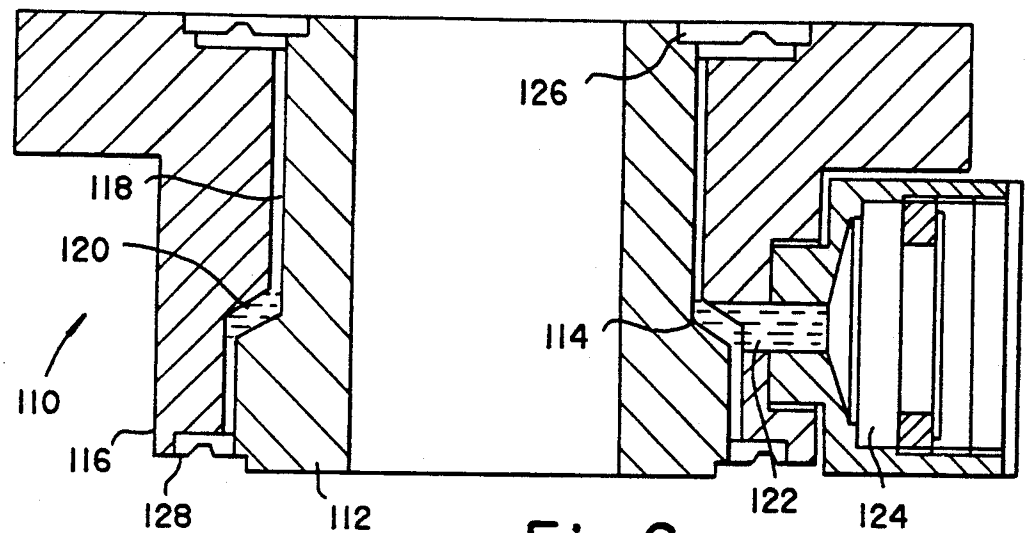
FIGS. 6,7 show two embodiments of particularly preferred elastic joints with integrated sensors.
Figure 7:
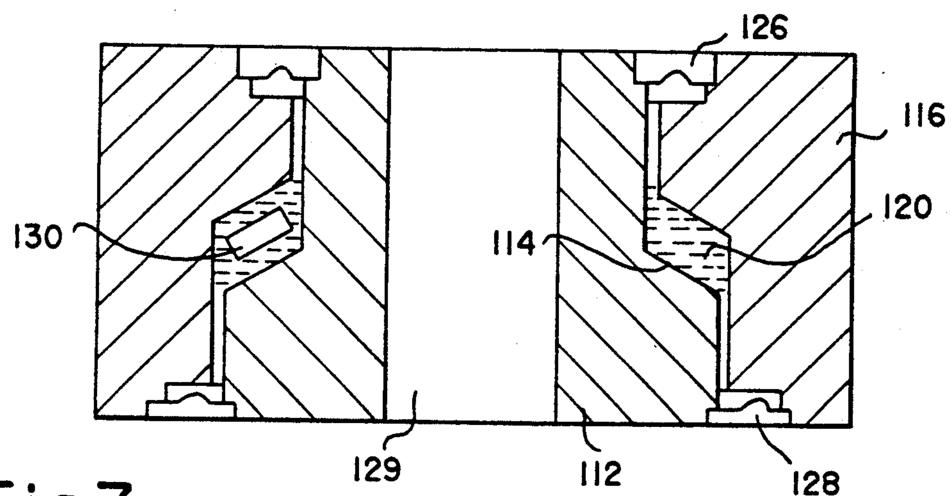

FIGS. 6 and 7 show preferred elastic joints between two parts arranged coaxially to each other. Due to the lateral provision of the sensor electric and hydraulic lines or actuating wires for operating various control elements in the landing gears and other units may be passed through the tubelike inner part.

Specifically, FIG. 6 shows an elastic joint 110 including an inner tubelike part 112 the exterior diameter of which being increased over a predetermined region such that there is formed a preferably slanted step 114. The inner tubelike part 112 has a central passage and is surrounded by a generally tubelike exterior part 116 the interior contour of which is essentially complementary to the peripheral outer surface of the inner tubelike part 112 leaving a narrow annular gap 118 filled with bubblefree elastomeric material. In the region of the step 114 of the inner tubelike part 112 the annular gap 118 is somewhat expanded such that there is formed a frustroconical intermediate space 120 filled with elastomeric material and connected to the force or pressure introduction side of a sensor 124 through a radial bore 122 preferably filled with elastomeric material or an incompressible liquid as well. The sensor 124 is laterally attached to the exterior part 116.

The annular gap 118 filled with elastomeric material may be covered by an upper and lower ring 126, 128, respectively, such that the elastomeric material is protected from deterioration.

FIG. 7 shows an embodiment still simplified as compared with that of FIG. 6 at least one sensor 130 being embedded into the elastomeric material filling the expanded intermediate space 120.

It is pointed out again that it is a particular advantage of an elastic joint having integrated a sensor therein according to the invention that in central passage 129 of the inner tubelike part 112 various lines, ducts and wires may be passed. The inner tubelike part 112 and the exterior part 116 may constitute end portions of any desired parts to be elastically connected. Alternatively, the exterior part 116 and the inner tubelike part 112 may be threaded or connected in any desired other manner to any desired element as this is indicated at the top end surface of the exterior part 116 in FIG. 7.

In operation, if a force is exerted to the exterior part 116 from above with the inner tubelike 112 being vertically supported the force will be transmitted essentially friction free to the sensor 124 or 130 respectively. Again, lateral forces will be completely deviated or shunted to the exterior part 116 due to the elastomeric material in the narrow annular gap.

Figure 8:
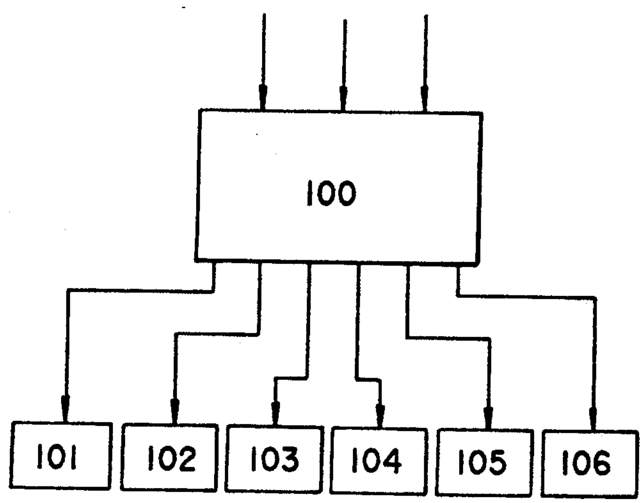
FIG. 8 is a block diagram of a system control unit according to the invention.

It should be mentioned that in particular the embodiment according to FIG. 7 may use several sensors 130 peripherally distributed in the intermediate space 120 embedded in the elastomeric material the sensors being connected via corresponding electrical lines, preferably passed through the interior of the inner tublike part 112, (or even wireless) to a system control unit or board computer. FIG. 8 schematically illustrates the design of the system or board computer according to the invention including a processor 100 (see also FIG. 1) representing the system control unit. Such type of systems control unit has now been in use for many years and is a mandatory requisite of all larger aircraft. A person skilled in the art of data processing may establish a corresponding program for the processor using the measured values or parameter, stored reference values and appropriate mathematical relations between these parameters for generating various control signals and results. In particular, the processor 100 may issue a control signal to a steering control circuit 101 setting the steering angle and/or the degree of servo-steering. A further control signal may be applied to a engine operating control circuit 102 controlling the fuel supply, the ignition time and other parameters of the engine. The processor 100 may supply further control signals to a spring or suspension control circuit 103 for adjusting the attenuation or dampening of the spring or the suspension dependent on the momentary load, the load added, the lane condition and lateral forces. A further control signal will be supplied from the processor 100 to a brake control circuit 104 for controlling, for example, the ABS-systems of the individual wheels. An emergency control unit 106 type initiates appropriate emergency measures upon receipt of an emergency signal from the processor 100. A display control circuit 105 is connected to the processor 100 for displaying the measured and calculated values optically and/or acoustically and for indicating instructions for the operator.

Further information for optimizing the operation of an aircraft may be derived from sensors integrated in elastic joints of the empennage, the wing lids, the motor suspension and other portions. These signals are useful not only for starting and landing but also during the flight.

I claim:

1. An aircraft having a plurality of essentially rigid parts elastically connected with each other, comprising:

elastomeric material provided in connecting joints between said rigid parts;

at least one sensor integrated in said connecting joints for determining forces and/or moments acting at said connecting joints and for generating signals representing said forces and/or moments, wherein said sensors are integrated in connecting joints between struts of a landing gear of said aircraft and a body of said aircraft, further wherein said sensors are integrated in connecting joints incorporated in said struts, and further wherein said sensors are integrated in connecting joints between support bars of said landing gear of said aircraft and said body of said aircraft, said support bars extending at an oblique angle relative to the horizontal.

2. The aircraft of claim 1, wherein said connecting joint is incorporated in said support bar.

3. The aircraft of claim 1, wherein at least one of said sensors is integrated in connecting joints provided between struts of landing gear of said aircraft and wheel support means of said landing gear.

4. The aircraft of claim 1, wherein said sensors are positioned symmetrically relative to a vertical plane extending through a longitudinal axis of said aircraft.

5. A system for controlling the operation of an aircraft having a plurality of essentially rigid parts elastically connected with each other, comprising:

force/moment sensor means integrated in elastic connecting joints between said rigid parts for determining forces and/or moments, respectively, acting at said connecting joints and generating signals representing said forces and/or moments, wherein said force/moment sensors are embedded in elastomeric material in said elastic connecting joints, said elastic connecting joints being incorporated within support elements for supporting a body of said aircraft on landing gear means, wherein at least one of said support elements extends in a vertical direction and at least one of said other support elements extends at an oblique angle relative to said vertical direction; and a system control unit connected to said sensors for having signals of said sensors applied thereto, evaluating and processing said signals and providing output signals for controlling the operation of various units of said aircraft based on said forces/moment measured by said sensors.

6. The system of claim 5, wherein at least one of the sensors is integrated in elastic connecting joints between struts of landing gear of the said aircraft and wheel axles supporting said struts.

7. The system of claim 5, wherein said elastic connecting joints comprise coaxial tubes forming an annular gap therebetween filled with bubblefree elastomeric material in strongly adhesive contact with said force/-moment sensors.

8. The system of claim 7, wherein at least one of said sensors is laterally attached to an exterior of said tubes.

9. The system of claim 7, wherein at least one sensor is embedded in said elastomeric material.

* * * * *